(No Model.)

H. W. MORGAN.
WOOD SCREW.

No. 507,919. Patented Oct. 31, 1893.

Witnesses-
Geo. E. Frech.
Roland A. Fitzgerald

Inventor-
Hubert W. Morgan
per
Lehmann Pattison Nesbit
Attys

UNITED STATES PATENT OFFICE.

HUBERT W. MORGAN, OF MERIDEN, CONNECTICUT.

WOOD-SCREW.

SPECIFICATION forming part of Letters Patent No. 507,919, dated October 31, 1893.

Application filed August 7, 1893. Serial No. 482,540. (No model.)

*To all whom it may concern:*

Be it known that I, HUBERT W. MORGAN, of Meriden, in the county of New Haven and State of Connecticut, have invented certain new and useful Improvements in Wood-Screws; and I do hereby declare the following to be a full, clear, and exact description of the invention, such as will enable others skilled in the art to which it pertains to make and use it, reference being had to the accompanying drawings, which form part of this specification.

My invention relates to an improvement in wood screws; and it consists in a screw of the particular construction hereinafter fully described and pointed out in the claims.

The object of my invention is to provide a screw with a shank portion so shaped and so proportioned in relation to the thread that all friction is released on the shank upon the wood in screwing the same in position, whereby splitting is prevented and the screw more easily driven into position, and which, owing to its peculiar shape, has a tendency to force the screw inward and forms a lock for preventing the same working outward when the thread has become loose, and which construction will not weaken the said shank.

Figure 1:
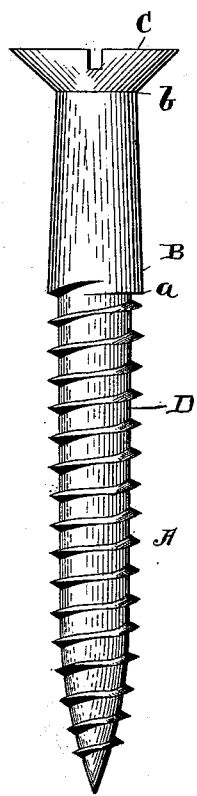
Figure 2:
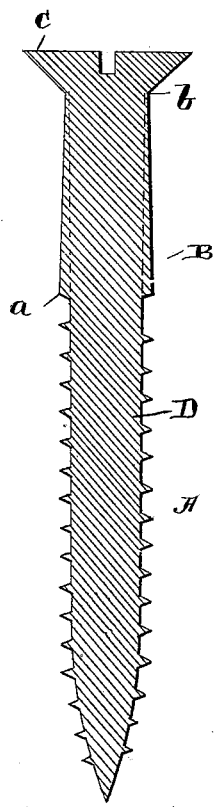

In the accompanying drawings: Figure 1, is a view which embodies my invention. Fig. 2, is a longitudinal sectional view of the same.

Referring to the drawings A represents the threaded portion of the screw, and B the shank portion, and C the head thereof. The head C and the threaded portion A, may be, and preferably are, of the ordinary construction.

My invention consists in the peculiar construction of the shank B. By reference to the drawings it will be seen, that the inner end of this shank B is substantially the same diameter as the diameter of the thread, as shown at the point $a$, Fig. 2, and then tapers gradually from this point up to the point $b$, where it joins with the head C. Attention is directed to the fact that the shank is larger in diameter at the point $b$, than the main portion D of the main portion of the threaded part of the screw, whereby the shank is made strong throughout its entire length, and especially at the point where it joins with the thread A. By forming the shank B tapering from the inner end of the threaded portion of the screw until it joins with the head C, the same is made smaller in diameter throughout its entire length than the thread, whereby all friction of this shank upon the wood into which the screw is being driven is avoided thus making it easier to drive to place, and which, owing to this peculiar tapered shank B, the tendency thereof is to force the screw inward as it is being turned, and this shank being larger at its inner end than at its outer end forms a lock for the screw after being driven to place which prevents the screw from working out when the thread may have become loose from wear, such as the jarring and shaking of wagons or other vehicles, or in buildings or in other places where there is a continual shake or jar.

It will be readily understood that the wood after the threaded portion has passed through it, will slowly contract around the shank B, and the same form a positive lock to prevent it from working outward, which is common in wood screws where the part which it holds is subjected to a constant jar. While this forms a lock by the wood gradually contracting around it, it at the same time relieves friction when the screw is being driven into place.

I am aware that the shanks or screws have heretofore been reduced so that they are smaller in diameter than the diameter of the threaded portion, for the purpose of relieving the friction and preventing the splitting of the wood, but in this instance, the shank has been substantially of the same diameter as the diameter of the main portion D of the threaded part of the screw. Owing to this fact the shank has been weakened at the point where it joins on to the threaded portion and also at the point where it joins on to the head C. Also owing to this construction, while it releases the friction it permits the screw to work loose more readily, owing to the fact that there is no friction whatever caused by the shank, as is the case in my construction.

So far as I am aware, I am the first one to taper the shank inward from the junction thereof with the threaded portion to the head C, whereby a lock is formed to prevent the screw from working outward. Also where the shank is reduced to an equal diameter with the threaded portion, as has heretofore been done, it requires a great deal of work and power to reduce the shank of the thread which makes the screw a commercial failure. In my construction, however, the reduction is slight as will be seen, from the point $a$ to the point $b$, while at the same time all of the advantages of relieving friction is gained, and at the same time a lock produced as above described.

Having thus described my invention, what I claim, and desire to secure by Letters Patent, is—

1. As an improved article of manufacture a screw having a shank which is tapered inward from the junction thereof with the threaded portion to the junction thereof with the head.

2. As an improved article of manufacture, a screw having a shank which is of substantially the same diameter as the threaded portion at the junction therewith, but larger in diameter at this point than the diameter of the main portion of the threaded part of the screw, and tapered gradually inward from this point until it joins with the head of the screw.

3. As an improved article of manufacture a screw having a shank which is of substantially the same diameter as the threaded portion at the junction therewith, but larger than the main portion of the threaded part of the screw and which tapers inward from this point to the junction thereof with the head, but which is larger in diameter at the junction with the head than the diameter of the main portion of the threaded part of the screw.

In testimony whereof I affix my signature in presence of two witnesses.

HUBERT W. MORGAN.

Witnesses:
JOHN W. NICKERSON,
CLIFFORD P. SHERMAN.